Aug. 22, 1939.  R. C. BOUGHTON  2,170,004
PIPE JOINT
Filed Sept. 7, 1937
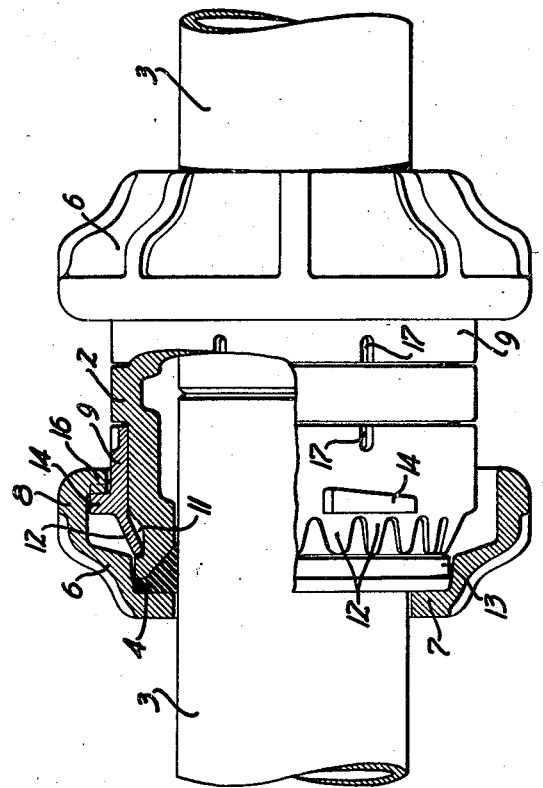
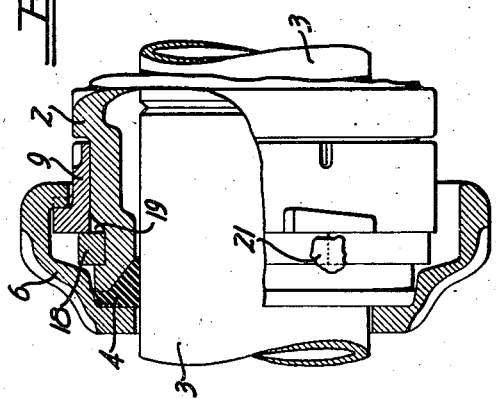
INVENTOR
ROGER C. BOUGHTON
BY Charles J. Evans
HIS ATTORNEY Patented Aug. 22, 1939

2,170,004

UNITED STATES PATENT OFFICE 2,170,004

PIPE JOINT

Roger C. Boughton, San Francisco, Calif.

Application September 7, 1937, Serial No. 162,656

5 Claims. (Cl. 285—177)

My invention relates to a coupling for joining pipes in a pipe line; and the broad object of the invention is to provide improved locking means for holding a gasket against an element of the coupling.

The invention possesses other objects and features of advantage, some of which, with the foregoing will be set forth in the following description of my invention. It is to be understood that I do not limit myself to this disclosure of species of my invention, as I may adopt variant embodiments thereof within the scope of the claims.

Referring to the drawing:

Figure 1 of the drawing is a side view, partly in section and partly in elevation, showing a coupling embodying the improvements of my invention; and Figure 2 is a fragmentary view showing a modified means for holding the locking ring.

In terms of broad inclusion, the pipe joint of my invention comprises an annular element for encircling a pipe, a gasket adjacent an end of the element, a second annular element for encircling the pipe to apply pressure to the gasket, and a locking ring on the first element and engageable with the second element for locking the elements together. The locking ring has an inside diameter larger than the end diameter of the first element, whereby the ring may be slipped into assembled position over the end of the first element, and means are provided for holding the ring in assembled position.

In greater detail, and referring to the drawing, the pipe joint comprises an annular coupling element or sleeve 2 embracing the ends of pipes 3. A gasket 4 is provided at each end of sleeve 2, and the ends of the latter are preferably tapered to form a conical seat for the complementary formed gasket. By this arrangement the gasket seals tightly against the end of the sleeve and at the same time is pressed firmly against the pipe when pressure is applied to the gasket.

A second annular element or retaining ring 6 is provided at each end of the sleeve for applying pressure to the gaskets. These retaining rings are cup-shaped, having an inwardly extending flange 7 for engaging the gasket, and having an axially extending flange 8 overlying the end portions of sleeve 2. The gaskets are preferably initially subjected to pressure by means of a bolt frame such as shown in my co-pending application, Serial No. 35,446. With such a frame, or other suitable means, the retaining rings 6 are drawn together over the ends of the sleeve to compress gaskets 4.

A locking ring 9 is provided at each end of the sleeve for locking retaining rings 6 against outward movement when the bolt frame is removed, so that the gaskets are maintained under permanent pressure. These locking rings are rotatably mounted on the sleeve, and have an inside diameter larger than the end diameter of the sleeve, whereby the rings may be slipped into assembled position over the ends of the sleeve.

Means are provided for holding the locking rings in assembled position on the sleeve. For this purpose an annular groove 11 is formed in the peripheral portions of the sleeve, underlying flange 8 of the retaining ring. A series of fingers 12 on the end of the locking ring extend inwardly to engage groove 11 and abut the shoulder 13 formed by the groove. These fingers form a serrated flange which securely holds the locking ring against outward movement, yet allows free rotation of the ring.

Locking ring 9 is preferably of malleable iron, and when the ring is formed the flange fingers 12 extend straight out. Since the inside diameter of ring 9 is larger than the diameter of shoulder 13, the ring is readily slipped inwardly over the end of the sleeve. When in assembled position the fingers 12 are deformed or bent inwardly to engage the groove.

Suitable tapered lugs 14 are provided on locking ring 9 for engaging inwardly extending and complementary tapered lugs 16 projecting from the retaining ring. The latter ring may thus be slipped inwardly over the lugs 14, and when ring 9 is rotated to engage the lugs the retaining ring is securely locked in position. In order to rotate the locking ring the portion of it which projects out from under the retaining ring is provided with sockets 17, with which a suitable tool may be engaged.

Figure 2 shows a modified holding means for the locking ring. In this case the locking ring is assembled over the end of the sleeve, and a split stop ring 18 is then snapped into a groove 19 provided in the sleeve. The ends of the split ring are then preferably welded together and to the sleeve as indicated at 21.

I claim:

1. A pipe joint comprising an annular element for encircling a pipe, a gasket adjacent an end of the element, a second annular element for encircling the pipe to apply pressure to the gasket, a locking ring on the first element and engageable with the second element for locking the elements together, the inside diameter of the ring being larger than the end diameter of the first element whereby the ring may be slipped into assembled position over the end of said first element, and means for holding said ring in assembled position.

2. A pipe joint comprising an annular element for encircling a pipe and having a peripheral groove, a gasket adjacent an end of the element, a second annular element for encircling the pipe to apply pressure to the gasket, a locking ring on the first element and engageable with the second element for locking the elements together, and deformable holding means on the ring and bent inwardly to engage said groove.

3. A pipe joint comprising an annular element for encircling a pipe and having a peripheral shoulder, a gasket adjacent an end of the element, a second annular element for encircling the pipe to apply pressure to the gasket, a locking ring on the first element and engageable with the second for locking the rings together, the inside diameter of the ring being larger than the diameter of said shoulder, and means abutting the shoulder for retaining the locking ring.

4. A pipe joint comprising an annular element for encircling the pipe, a gasket adjacent an end of the element, a second annular element for encircling the pipe to apply pressure to the gasket, a locking ring on the first element and engageable with the second for locking the elements together, and a split stop ring on the first element for holding the locking ring.

5. A pipe joint comprising an annular element for encircling a pipe, a gasket adjacent an end of the element, a second annular element for encircling the pipe to compress the gasket, said second element overlapping the first, a turnable locking ring interposed between the overlapping surfaces of the elements for locking the latter together, the inside diameter of the locking ring being larger than the end diameter of the first element whereby the ring may be slipped into assembled position over the end of the first element, and means for holding the ring in assembled position.

ROGER C. BOUGHTON.